United States Patent
Chen

(10) Patent No.: US 11,865,585 B2
(45) Date of Patent: Jan. 9, 2024

(54) SORTING APPARATUS AND SORTING METHOD

(71) Applicant: Beijing Jingdong Qianshi Technology Co., Ltd., Beijing (CN)

(72) Inventor: Xiaochong Chen, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 99 days.

(21) Appl. No.: 17/606,483

(22) PCT Filed: Mar. 26, 2020

(86) PCT No.: PCT/CN2020/081323
§ 371 (c)(1),
(2) Date: Oct. 26, 2021

(87) PCT Pub. No.: WO2020/258956
PCT Pub. Date: Dec. 30, 2020

(65) Prior Publication Data
US 2022/0219201 A1    Jul. 14, 2022

(30) Foreign Application Priority Data
Jun. 28, 2019   (CN) .......................... 201910574805.X

(51) Int. Cl.
*B07C 3/08* (2006.01)
*B65G 41/00* (2006.01)
(Continued)

(52) U.S. Cl.
CPC .............. *B07C 3/08* (2013.01); *B65G 11/023* (2013.01); *B65G 41/003* (2013.01);
(Continued)

(58) Field of Classification Search
CPC .............. B07C 3/08; B07C 3/02; B07C 5/36; B07C 5/3422; B07C 5/361; B07C 5/38;
(Continued)

(56) References Cited

U.S. PATENT DOCUMENTS

| | | | |
|---|---|---|---|
| 6,082,521 A | 7/2000 | Maier et al. | |
| 2007/0084764 A1 | 4/2007 | Benninger | |
| 2012/0037481 A1 | 2/2012 | He et al. | |
| 2012/0042612 A1 | 2/2012 | Weber | |

FOREIGN PATENT DOCUMENTS

| | | | |
|---|---|---|---|
| CN | 1185357 A | | 6/1998 |
| CN | 106269540 A | * | 1/2017 |

(Continued)

OTHER PUBLICATIONS

International Search Report for PCT/CN2020/081323, dated Jun. 17, 2020, 3 pages.

*Primary Examiner* — Gene O Crawford
*Assistant Examiner* — Muhammad Awais
(74) *Attorney, Agent, or Firm* — Blank Rome LLP

(57) ABSTRACT

A sorting apparatus, comprising: transportation vehicles for moving, on the basis of a control instruction, along a direction of a transportation row to a target position indicated by the control instruction, such that an object to be sorted is transferred from the current transportation vehicle on which the object is currently placed to a next-row transportation vehicle, wherein the transportation row where the next-row transportation vehicle is located is adjacent to the transportation row where the current transportation vehicle is located in a direction away from a feed inlet. The sorting apparatus occupies a small space, has low requirements on sites, and can be widely applied. Also comprised are a sorting method for a control module of the sorting apparatus, and ac electronic device and a computer-readable storage medium for implementing the sorting method.

18 Claims, 6 Drawing Sheets

(51) Int. Cl.
  *B65G 11/02* (2006.01)
  *G05B 19/418* (2006.01)
(52) U.S. Cl.
  CPC ............ *G05B 19/41895* (2013.01); *G05B 2219/45047* (2013.01); *G05B 2219/50393* (2013.01)
(58) Field of Classification Search
  CPC .......... B65G 11/023; B65G 41/003; G05B 19/41895; G05B 2219/45047; G05B 2219/50393; G05B 2219/50397
  USPC ..................................................... 209/584
  See application file for complete search history.

(56) References Cited

FOREIGN PATENT DOCUMENTS

| | | | |
|---|---|---|---|
| CN | 108453062 A | | 8/2018 |
| CN | 109719040 A | * | 5/2019 |
| CN | 109807068 A | | 5/2019 |
| DE | 102005061309 A1 | * | 7/2007 |
| JP | H-0745453 | | 10/1995 |
| JP | H-101216 A | | 1/1998 |
| JP | 2000195919 A | | 7/2000 |
| JP | 5188642 B1 | | 2/2013 |
| KR | 20180056945 A | * | 5/2018 |
| KR | 20180056945 A | * | 5/2018 |
| WO | WO-2011/038442 A2 | | 4/2011 |
| WO | WO-2011038442 A2 | * | 4/2011 |

* cited by examiner

400

Controlling, by sending a control instruction, a transportation vehicle to move along a direction of a transportation row to a target position indicated by the control instruction, so that a to-be-sorted item is transferred from the current transportation vehicle on which the to-be-sorted object is currently placed to a next-row transportation vehicle — 401

500

SORTING APPARATUS AND SORTING METHOD

This application is a national stale of International Application No. PCT/CN2020/081323, filed on Mar. 26, 2020, which claims the priority of Chinese Patent Application No, 201910574805.X, titled "SORTING APPARATUS AND SORTING METHOD", filed by Beijing Jingdong Qianshi Technology Co., Ltd. on Jun. 28, 2019. Both of the aforementioned applications are hereby incorporated by reference in their entireties.

TECHNICAL FIELD

Embodiments of the present disclosure relate to the technical field of computers, specifically to the technical field of the Internet, and in particular to a sorting apparatus and a sorting method.

BACKGROUND

With the rapid development of the logistics industry, especially, with the increasing business volume of industries such as online shopping and express delivery, the demand for sorting apparatuses has been greatly increased. Sorting apparatuses mainly include circular cross-belt sorters and linear cross-belt sorters. The circular cross-belt sorters are dominant in applications, but in some special occasions, the linear cross-belt sorters are used.

SUMMARY

Embodiments of the present disclosure provide a sorting apparatus and a sorting method.

In a first aspect, some embodiments of the present disclosure provide a sorting apparatus, including: a plurality of transportation vehicles, the plurality of transportation vehicles being distributed on at least two transportation rows, the at least two transportation rows being arranged along a direction away from a feed inlet, and a transportation vehicle being configured to move, based on a control instruction, along a direction of the transportation rows to a target position indicated by the control instruction, so that a to-be-sorted item is transferred from a current transportation vehicle on which the to-be-sorted item is currently placed to a next-row transportation vehicle, where a transportation row where the next-row transportation vehicle is located is adjacent to a transportation row where the current transportation vehicle is located in a direction away from the feed inlet, In a second aspect, some embodiments of the present disclosure provide a sorting method for a control module of a sorting apparatus, the method includes: controlling, by sending a control instruction, a transportation vehicle to move along a direction of a transportation row to a target position indicated by the control instruction, so that a to-be-sorted item is transferred from a current transportation vehicle on which the to-be-sorted item is currently placed to a next-row transportation vehicle, where a transportation row where the next-row transportation vehicle is located is adjacent to a transportation row where the current transportation vehicle is located in a direction away from the feed inlet.

In a third aspect, some embodiments of the present disclosure provide an electronic device, including: one or more processors; a storage apparatus configured to store one or more programs, where the one or more programs, when executed by the one or more processors, cause the one or more processor to implement the method as in any of embodiments of the sorting method for the sorting apparatus.

In a fourth aspect, some embodiments of the present disclosure provide a computer-readable storage medium storing a computer program, where the program, when executed by a processor, implements the method as in any of embodiments of the sorting method for the sorting apparatus.

BRIEF DESCRIPTION OF THE DRAWINGS

By reading the detailed description of non-limiting embodiments with reference to the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the disclosure and the features in the embodiments may be combined with each other on a non-conflict basis. The disclosure will be described below in detail with reference to the accompanying drawings and in combination with the embodiments.

Figure 1A:
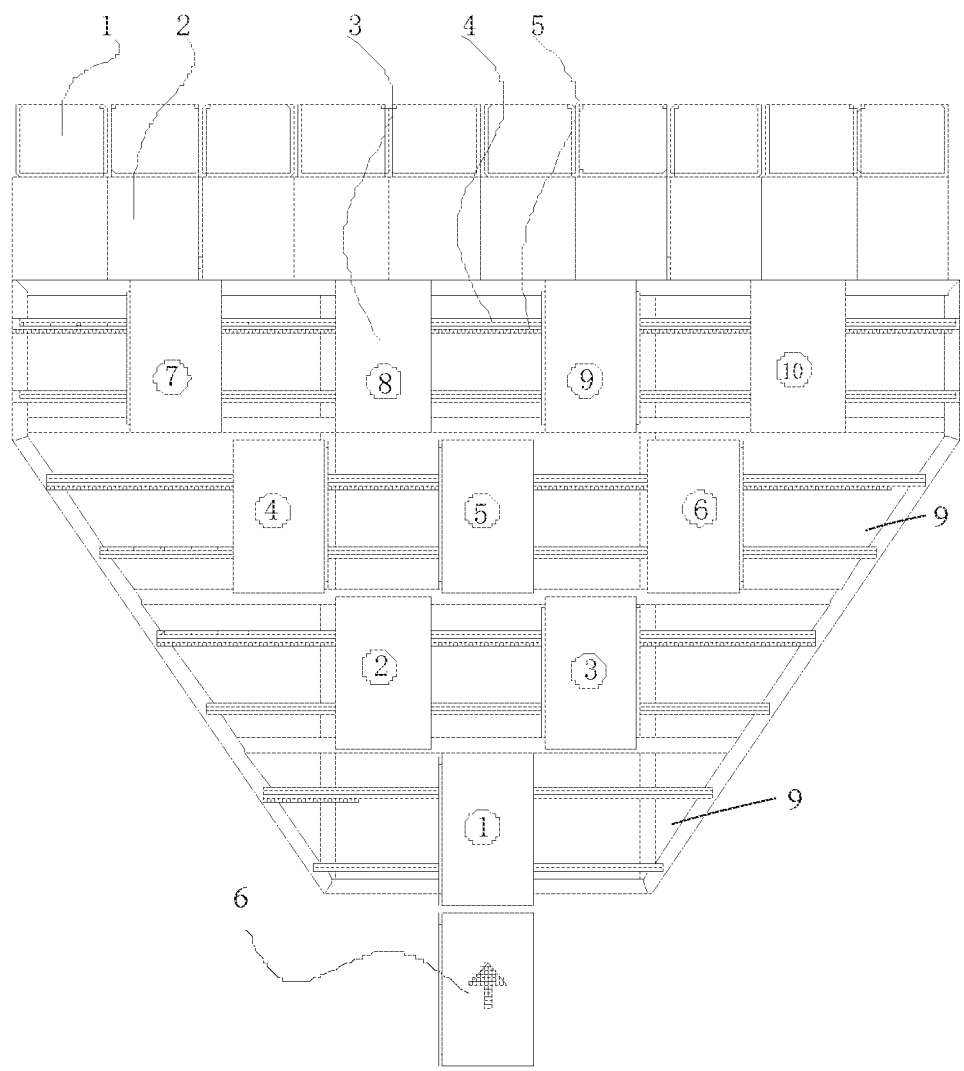
FIG. 1a is a schematic diagram of an embodiment of a sorting apparatus according to the present disclosure.

FIG. 1a shows an embodiment of a sorting apparatus according to the present disclosure. The sorting apparatus includes: a plurality of transportation vehicles ①-⑩. The plurality of transportation vehicles are distributed on at least two transportation rows 9, and the at least two transportation rows are arranged in a direction away from a feed inlet 6.

In some implementations, n transportation vehicles are arranged on a $n^{th}$ row of the at least twp transportation rows, where n is a positive integer.

In some implementations, 2n-1 transportation vehicles are arranged on a $n^{th}$ row of the at least two transportation rows, where n is a positive integer.

The transportation vehicles are configured to move, based on a control instruction, along a direction of a transportation row to target positions indicated by the control instruction, so that a to-be-sorted item is transferred from the current transportation vehicle on which the to-be-sorted item is currently placed to a next-row transportation vehicle, where a transportation row where the next-row transportation vehicle is located is adjacent to the transportation row where the current transportation vehicle is located in the direction away from the feed inlet.

In this embodiment, a control module may acquire a sorting route of the to-be-sorted item, and control, according to the sorting route, the transportation vehicles of the plurality of transportation vehicles to move to target positions of transportation rows based on the control instruction in this way, the to-be-sorted item is transferred from the current transportation vehicle on which the to-be-sorted item is currently placed so the next-row transportation vehicle. For example, the transportation vehicles at target positions of adjacent transportation rows are aligned (in a straight line) or partially aligned in a direction perpendicular or approximately perpendicular to the transportation rows, so that the to-be-sorted item is transferred between adjacent transportation rows. In some implementations, transportation directions of the transportation vehicles are approximately perpendicular to the direction of the transportation rows.

A transportation vehicle may be moved to a target position in various ways. For example, the sorting apparatus may be equipped with a rack, and all transportation vehicles in a transportation row may be moved through the driving of the rack. Through this movement way, a transportation vehicle in the transportation row may be moved to the target position.

In practice, the sorting apparatus may implement the transfer of the to-be-sorted item between rows through disposing conveyor belts for transportation vehicles. In some implementations, the moving directions of the conveyor belts are approximately perpendicular to the direction of the transportation rows. In addition, the sorting apparatus may alternatively be provided with a robotic arm to transfer the to-be-sorted item from the current transportation vehicle on which the to-be-sorted item is currently placed to a next-row transportation vehicle.

In practice, a transportation vehicle may be provided with a driving mechanism (for example, the driving mechanism may include a servo motor and a gear), and the driving mechanism may receive a control instruction to control the transportation vehicle to move. Alternatively, the sorting apparatus may be provided with a driving mechanism for each transportation row, and the driving mechanism may use a rack or a conveyor belt to perform transportation on the transportation row, thereby driving each transportation vehicle on the transportation row to move. Correspondingly, the control instruction may be sent to the driving mechanism arranged in the transportation vehicle, or may be sent to the driving mechanism for each transportation row.

The sorting apparatus may include a control module. The control module may acquire a sorting route of the to-be-sorted item, and generate a control instruction according to the sorting route. In addition, another electronic device other than the sorting apparatus may alternatively Generate the control instruction.

A sorting route may be used to indicate target positions where a to-be-sorted item is located when passing the transportation rows of the sorting apparatus. The sorting route indicates a target position on each transportation row.

In practice, the control module may acquire a sorting route in various ways. For example, the control module may acquire the sorting route pre-stored locally, or acquire the sorting route from another electronic device. In addition, the sorting apparatus may include a scanning module, and the scanning module may be arranged at a feed inlet to scan the to-be-sorted item. The control module may acquire the sorting route through the item information obtained by scanning.

Figure 2A:
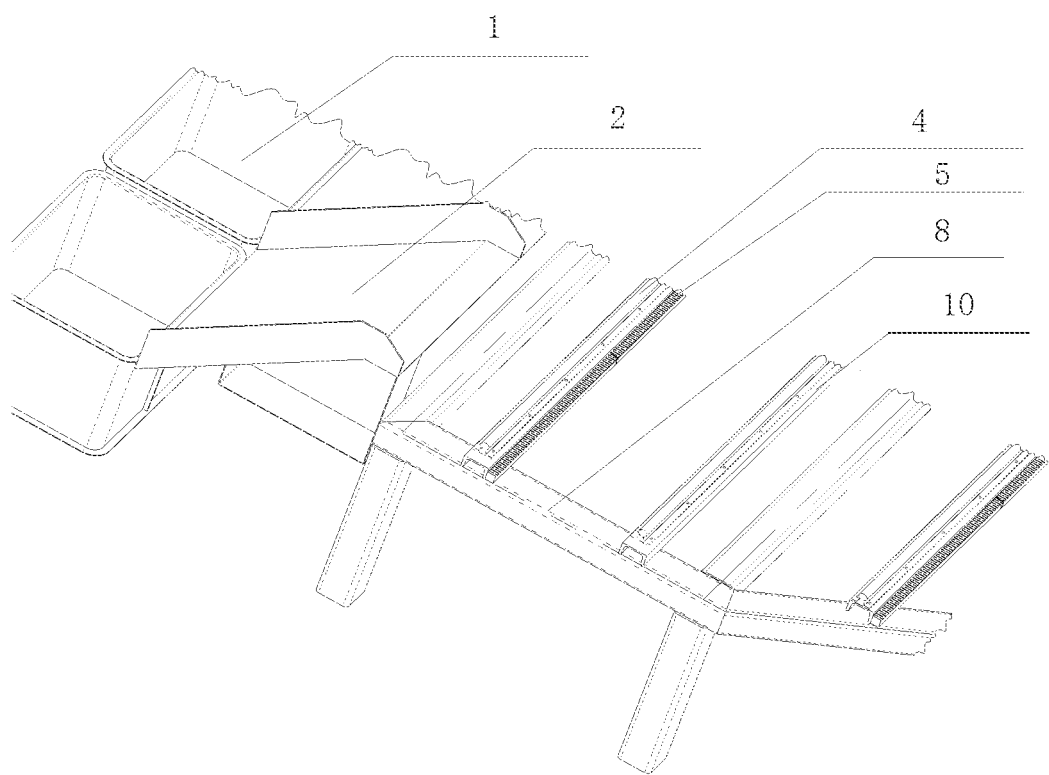
FIG. 2a is a partial schematic diagram of the sorting apparatus according to the present disclosure.

As shown in FIG. 1a and FIG. 2a, alternatively, transportation vehicles on each transportation row may correspond to two guide rails 4, and a rack 5 arranged compactly with at least one of the two guide rails.

As shown in FIG. 1a, ①, ②, ③, ④, ⑤, ⑥, ⑦, ⑧, ⑨, ⑩ in the figure are transportation vehicles on transportation rows 9, and 3 represents a transportation vehicle. There is at least one transportation vehicle on each transportation row. For example, transportation vehicles ② and ③ are in the same transportation row. 6 in the figure is a feed inlet.

In some alternative implementations of this embodiment, the control module is configured to select a transportation vehicle closest to the target position from transportation vehicles on a transportation row as a target transportation vehicle, or select, based on distances between the transportation vehicles and the target position, a transportation vehicle other than a selected transportation vehicle as the target transportation vehicle, where the selected transportation vehicle is a transportation vehicle at a target position indicated by a control instruction of another to-be-sorted item; and the control module is further configured to control the target transportation vehicle to move along the direction of the transportation row to the target position indicated by the control instruction.

In these alternative implementations, the control module may use multiple approaches to select the transportation vehicle that will move to the target position as the target transportation vehicle. For example, in accordance with the principle of proximity, a transportation vehicle closest to the target position on the transportation row is used as the target transportation vehicle, and the target transportation vehicle is moved to the target position of the transportation row. If the sorting apparatus sorts more than two items at the same time, a transportation vehicle used as a selected transportation vehicle may be already at a target position indicated by a sorting route and cannot be used for sorting another to-be-sorted item. The control module may select a transportation vehicle other than the selected transportation vehicle as the target transportation vehicle. For example, the control module may select the transportation vehicle closest to the target position in accordance with the principle of proximity. In the case where the closest transportation vehicle is a transportation vehicle other than the selected transportation vehicle, the closest transportation vehicle is used as the target transportation vehicle, or in the case where the closest transportation vehicle is the selected transportation vehicle, a transportation vehicle second-closest to the target position on the transportation row is used as the target transportation vehicle. For another example, the control module may determine all the transportation vehicles other than the selected transportation vehicle on the transportation row, and use the transportation vehicle closest to the target position among these transportation vehicles as the target transportation vehicle.

In these implementation, a transportation vehicle closer to the target location may be selected based on a distance and moved to the target position, thereby reducing the consumption of the sorting process and accelerating the sorting speed.

In some alternative implementations of this embodiment, for adjacent transportation rows, the number of transportation vehicles on a transportation row farther from the feed inlet is greater than or equal to the number of transportation vehicles on a transportation row closer to the feed inlet.

In these alternative implementations, for two adjacent transportation rows, the number of transportation vehicles on the transportation row farther from the feed inlet is greater than or equal to the number of transportation vehicles on the transportation row closer to the feed inlet. Along the direction away from the feed inlet, the numbers of transportation vehicles on transportation rows increase row by row.

In practice, there may be only one feed inlet, and in order to sort various items, it is generally necessary to arrange a plurality of containers where the item arrives at the end of sorting, i.e., sorting outlet ports. With the above approach of setting the number of the transportation vehicles, the sorting apparatus may sort more than two to-be-sorted items at the same time, thereby improving the sorting efficiency.

In some alternative implementations of this embodiment, the control module may be further configured to acquire a processing result by preprocessing the to-be-sorted item, and determine, based on the processing result, a sorting route of the to-be-sorted item.

In these alternative implementations, the control module may acquire the sorting route using other ways. The control module may acquire the processing result of the preprocessing. The preprocessing includes scanning, or image acquisition and recognition. The control module may determine the sorting route of the to-be-sorted item based on the processing result of preprocessing.

Specifically, the control module may determine the sorting route based on the processing result in various ways. For example, the execution body performing the preprocessing may be a scanning apparatus connected to the sorting apparatus through a line, or communicatively connected to the sorting apparatus. The scanning apparatus may scan a graphic code such as a two-dimensional code or a bar code, so that the control module acquires graphic code information corresponding to the graphic code. The control module may determine the item information corresponding to the graphic code information, and use the item information as the processing result of the preprocessing. The control module may classify the item information into a preset category of item information, and determine the sorting route through the category of the item information. The item information herein may include an address, information for representing a category of a to-be-sorted item, and the like. Herein, the item category information may be, for example, information for indicating a geographical location range of a delivery destination of a to-be-sorted item, information for indicating whether the to-be-sorted item is a valuable item, or the like.

In addition, the execution body performing the preprocessing may be a camera and a control module of the sorting apparatus. The camera may acquire an image of a to-be-processed item, which may contain item information. The control module may recognize the image or send the image to another electronic device for image recognition, and obtain a recognition result as the processing result, that is, obtain the item information. Thereafter, the control module may determine the sorting route based on the item information.

These implementations may accurately determine a sorting route of each to-be-sorted item through scanning or image recognition, and ensure that all to-be-sorted items have accurate sorting results by instantly determining sorting routes, particularly when the number of to-be-sorted items is great.

In some alternative application scenarios of these implementations, the sorting apparatus further includes a plurality of containers, the containers being configured to receive a to-be-sorted item transported by a transportation vehicle on the transportation row farthest from the feed inlet. The control module is further configured to select, based on the processing result and a preset corresponding relationship between the processing result and the container, a container from the plurality of containers as a target container; and generate, based on a position of the target container, the sorting route from the feed inlet to the target container.

In these alternative application scenarios, the control module may determine the sorting route in various ways in the presence of a plurality of containers. For example, the control module may pre-acquire the corresponding relationship between the processing result and the container. The processing results herein may refer to item information, and one piece of item information may correspond to only one container or more than two containers. The control module may use the one container as the target container, or may select the target container from the two or more containers randomly or according to a preset selection rule. Each container may have a sorting route corresponding thereto, and the control module may determine a sorting route corresponding to the target container. The sorting route indicates the feed inlet being a start position, a target position of a to-be-sorted item in each transportation row, and the target container. These application scenarios can quickly and accurately determine the sorting route using the corresponding relationship between the processing result and the container.

In some alternative application scenarios of these implementations, the control module is further configured to select, based on the processing result and a corresponding relationship between the processing result and the sorting route, the sorting route from preset candidate sorting routes, where the sorting route includes one of the plurality of containers or a target position on the transportation row farthest from the feed inlet.

In these alternative application scenarios, the control module may alternatively pre-acquire the corresponding relationship between the processing result and the sorting route. There are as many correspondences as the preset candidate sorting routes. Each processing result herein has at least one correspondence, and thus each processing result may correspond to at least one sorting route. In the case where each processing result corresponds to one sorting route, the control module may select the sorting route from the candidate sorting routes. In the case where each processing result corresponds to more than two sorting routes, the control module may first determine the sorting routes corresponding to the processing result from the candidate sorting routes, and select a sorting route from the sorting routes randomly or according to a preset rule. The sorting route indicates the target position of the to-be-sorted item on each transportation row, and may alternatively indicate one of the containers.

These application scenarios can further quickly and accurately determine the sorting route using the corresponding relationship between the processing result and the sorting route.

Figure 1B:
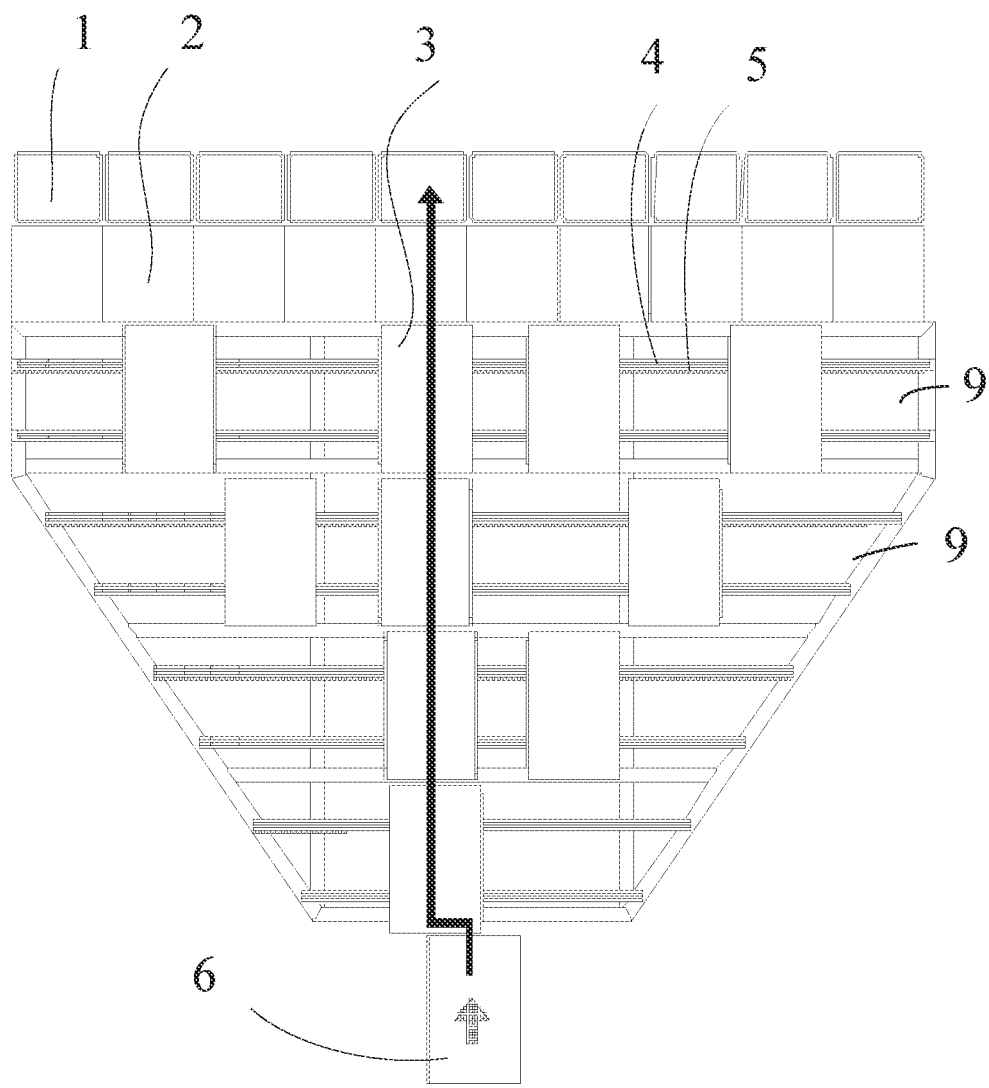
FIG. 1b is a schematic diagram of a sorting route or the sorting apparatus according to the present disclosure.

As shown in FIG. 1b, the arrow in the figure shows a sorting route.

In practice, a container may be a transfer box, such as a plastic transfer box, to facilitate subsequent transportation of an item. As shown in FIG. 1a, 1 represents a container.

In these application scenarios, the sorting route may be accurately determined using the processing result of the preprocessing to ensure that each to-be-sorted item may be accurately sorted.

In some alternative application scenarios of these implementations, the sorting apparatus further includes grid cell chutes, the grid cell chutes corresponding to the plurality of containers, so that a to-be-sorted item slides into a container corresponding to a grid cell chute.

In these alternative application scenarios, the transportation vehicles on the transportation row farthest from the feed inlet may cause to-be-sorted items to slide in the grid cell chutes and slide into the containers through the conveyor belts. Herein, there is a height difference between the conveyor belts of the transportation vehicles and the edges of the containers. Thus, the to-be-sorted items may quickly and accurately enter the containers after being sorted.

In some implementations, the number of the transportation vehicles on the transportation row farthest from the feed inlet is smaller than or equal to the number of the grid cell chutes.

In some implementations, the number of the grid cell chutes is M, and the number of the transportation vehicles on the transportation row farthest from the feed inlet is smaller than or equal to a rounded value of M/2.

As shown in FIG. 1a, 2 represents a grid cell chute.

As shown in FIG. 2a, a container 1, a grid cell chute 2, a guide rail 4 and a rack 5 are shown in the figure, and a square tube 8 used in a frame of the sorting apparatus is also shown in the figure. In addition, the figure also shows a channel steel 10 to which the rack 5 is attached, which may support the rack 5.

Figure 2B:
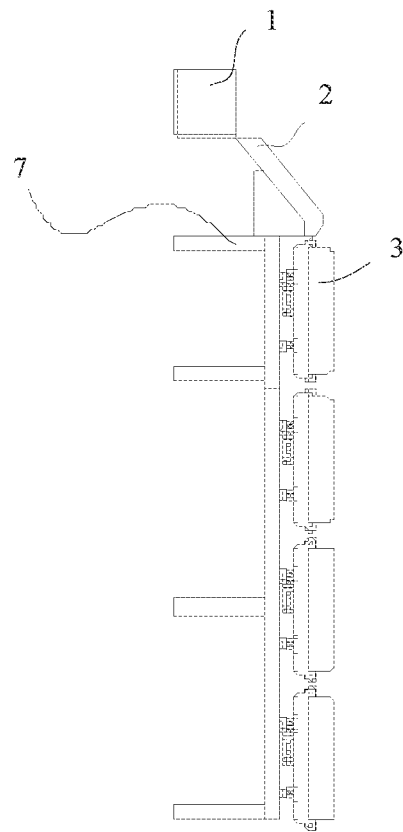
FIG. 2b is a schematic diagram of a left view of the sorting apparatus according to the present disclosure.

As shown in FIG. 2b, a bracket 7, the container 1, the grid cell chute 2 and the transportation vehicle 3 are shown.

The sorting apparatus provided by the embodiments of the present disclosure occupies a small space, has low requirements for a field, and can be widely used.

Figure 3:
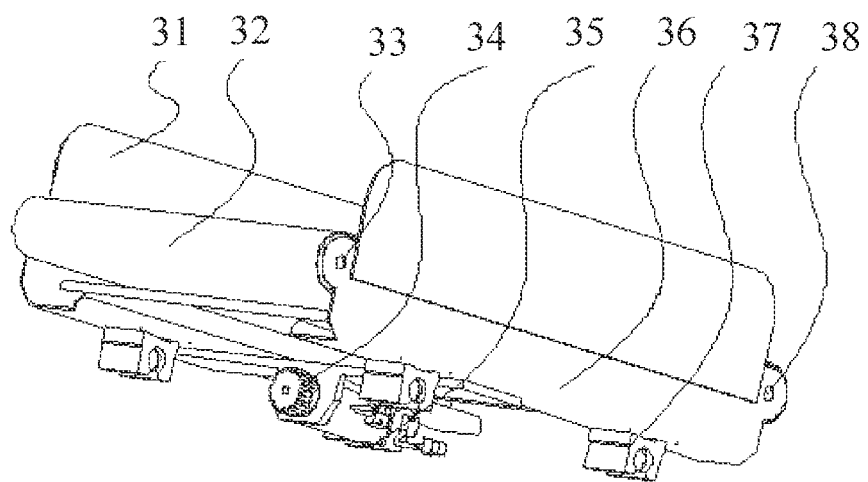
FIG. 3 is a schematic structural diagram of a transportation vehicle of the sorting apparatus according to the present disclosure.

With further reference to FIG. 3, FIG. 3 shows a transportation vehicle of the sorting apparatus.

The sorting apparatus further includes a guide rail and a rack, and the transportation vehicle includes: a conveyor belt 32, a roller 33, a driving gear 34, a servo motor 35, a linear bearing 37, a frame 36 and baffles 31. The roller is configured to drive the conveyor belt to transport the to-be-sorted item, so that the to-be-sorted item is transferred from the current transportation vehicle to the next-row transportation vehicle; the servo motor 35 is configured to rotate the driving gear 34, and the driving gear 34 drives the rack to move, so that the transportation vehicle follows the moving rack and moves in the direction of the transportation row; the linear bearing 37 is configured to move on the guide rail, where the guide rail passes through the linear bearing 37, and the linear bearing 37 is fixedly connected to the frame 36; and the baffles 31 are fixed to the frame 36 and located on both sides of the conveyor belt 32.

In these alternative application scenarios, as shown in FIG. 3, 33 is the roller and 38 is a driven roller. The roller 33 may be an electrical roller driven by electricity, which may drive the conveyor belt 32 of the transportation vehicle, so that the conveyor belt 32 transports the to-be-sorted item. In this way, the to-be-sorted item may be transferred between transportation vehicles on adjacent transportation rows.

The roller 33 may drive the conveyor belt 32 to smoothly transport the to-be-sorted item, so that the to-be-sorted item may be successfully transferred between the transportation rows.

As shown in FIG. 3, the servo motor 35 may drive the driving gear 34, and the driving Gear 34 drives the rack, so that each transportation vehicle may move individually on the transportation row, thereby avoiding ineffective energy loss and mechanical loss caused by the movement of all the transportation vehicles in the transportation row.

As for the transportation vehicle that needs to move on the transportation row, the linear bearing 37 may play a very good stabilizing role when the transportation vehicle moves on the transportation row, so that the transportation vehicle is prevented from deviating the transportation row.

When the conveyor belt transports the to-be-sorted item, the to-be-sorted item is at risk of slipping off the transportation vehicle. As shown in FIG. 3, the baffles 31 on both sides of the conveyor belt 32 can prevent the to-be-sorted item from slipping off the transportation vehicle, so that the to-be-sorted item may be transferred between the transportation rows more smoothly.

In some alternative cases of these application scenarios, a sum of lengths of the plurality of containers in the direction of the transportation row is equal to the length of the guide rail of the transportation row farthest from the feed inlet.

In these alternative cases, the plurality of containers in the sorting apparatus may have one-to-one corresponding relationship with the target positions indicated by all candidate sorting routes and located on the transportation row farthest from the feed inlet. By defining the length of the guide rail and the length of the plurality of containers, it can be ensured that a transportation vehicle moves to a target position.

Figures 4, 5:
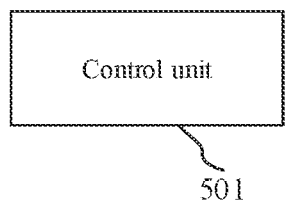
FIG. 4 is a flowchart of an embodiment of a sorting method for the sorting apparatus according to the present disclosure.
FIG. 5 is a schematic structural diagram of an embodiment of the sorting apparatus according to the present disclosure.

With further reference to FIG. 4, FIG. 4 shows a flow 400 of an embodiment of a sorting method for a control module of the sorting apparatus. The sorting apparatus includes: the control module and a plurality of transportation vehicles, the plurality of transportation vehicles being distributed on at least two transportation rows, the at least two transportation rows being arranged along a direction away from a feed inlet. The flow 400 of the sorting method includes the following steps.

Step 401 includes controlling, by sending a control instruction, a transportation vehicle to move along a direction of a transportation row to a target position indicated by the control instruction, so that a to-be-sorted item is transferred from the current transportation vehicle on which the to-be-sorted item is currently placed to a next-row transportation vehicle, where a transportation row where the next-row transportation vehicle is located is adjacent to the transportation row where the current transportation vehicle is located in a direction away from the feed inlet.

In some embodiments, the method further includes: acquiring a processing result by preprocessing the to-be-sorted item, where the preprocessing includes any one of following two operations: scanning, or image acquisition and recognition; determining, based on the processing result, a sorting route of the to-be-sorted item; and generating, based on the sorting route, the control instruction.

In some embodiments, the sorting apparatus further includes: a plurality of containers, the containers being configured to receive an item transported by a transportation vehicle on a transportation row farthest from the feed inlet. Determining, based on the processing result, the sorting route of the to-be-sorted item includes: selecting, based on the processing result and preset corresponding relationship between the processing result and the container, a container from the plurality of containers as a target container; and generating, based on a position of the target container, the sorting route from the feed inlet to the target container; or selecting, based on the processing result and the corresponding relationship between the processing result and the sorting route, the sorting route from preset candidate sorting routes, where the sorting route includes one of the plurality of containers or a target position of the transportation vehicle on the transportation row farthest from the feed inlet.

In some embodiments, the method further includes: selecting a transportation vehicle closest to the target position from transportation vehicles on a transportation row as a target transportation vehicle; or selecting, based on distances between the transportation vehicles and the target position, a transportation vehicle other than a selected transportation vehicle as the target transportation vehicle, where the selected transportation vehicle is a transportation vehicle at a target position indicated by a control instruction of another to-be-sorted item; and controlling the transportation vehicle to move along the direction of the transportation to the target position indicated by the control instruction row includes: controlling the target transportation vehicle to move along the direction of the transportation row to the target position indicated by the control instruction.

The sorting apparatus provided by the embodiments of the present disclosure occupies a small space, has low requirements for a field, and can be widely used.

With further reference to FIG. 5, as an implementation of the method shown in the above figures, the present disclosure provides an embodiment of the sorting apparatus. The embodiment of the apparatus corresponds to the embodiment of the method shown in FIG. 4, and the apparatus may be applied to various electronic devices.

As shown in FIG. 5, the sorting apparatus of this embodiment is shown. The sorting apparatus includes: a control module and a plurality of transportation vehicles, the plurality of transportation vehicles being distributed on at least two transportation rows, the at least two transportation rows being arranged along a direction away from a feed inlet.

The sorting apparatus includes: a control unit 501 configured to control, by sending a control instruction, a transportation vehicle to move along a direction of a transportation row to a target position indicated by the control instruction, so that a to-be-sorted item is transferred from the current transportation vehicle on which the to-be-sorted item is currently placed to a next-row transportation vehicle, where a transportation row where the next-row transportation vehicle is located is adjacent to the transportation row where the current transportation vehicle is located in a direction away from the feed inlet.

In some embodiments, a control module may acquire a sorting route of the to-be-sorted item, and control, according to the sorting route, the transportation vehicles of the plurality of transportation vehicles to move to target positions of transportation rows based on the control instruction in this way, the to-be-sorted item is transferred from the current transportation vehicle on which the to-be-sorted item is currently placed to the next-row transportation vehicle. For example, the transportation vehicles at target positions of adjacent transportation rows are aligned (in a straight line) or partially aligned in a direction perpendicular or nearly perpendicular to the transportation rows, so that the to-be-sorted item is transferred between adjacent transportation rows.

In some alternative implementations of this embodiment, the sorting apparatus further includes: an acquisition unit configured to acquire a processing result by, preprocessing the to-be-sorted item, where the preprocessing includes any one of two following operations: scanning, or image acquisition and recognition: a first determination unit configured to determine, based on the processing result, a sorting route of the to-be-sorted item; and a generation unit configured to generate, based on the sorting route, the control instruction.

In some alternative implementations of this embodiment, the apparatus further includes: a plurality of containers, the containers being configured to receive an item transported by a transportation vehicle on a transportation row farthest from the feed inlet; a second, determination unit configured to select, based on the processing result and a preset corresponding relationship between the processing result and the container, a container from the plurality of containers as a target container and generate, based on a position of the target container, the sorting route from the feed inlet to the target container; or a third determination unit configured to select, based on the processing result and the corresponding relationship between the processing result and a sorting route, the sorting route from preset candidate sorting routes, where the sorting route includes one of the plurality of containers or a target position of the transportation vehicle on the transportation row farthest from the feed inlet.

In some alternative implementations of this embodiment, the apparatus further includes: a first selection unit configured to select a transportation vehicle closest to the target position from transportation vehicles on a transportation row as a target transportation vehicle; or a second selection unit configured to select, based on distances between the transportation vehicles and the target position, a transportation vehicle other than a selected transportation vehicle as the target transportation vehicle, where the selected transportation vehicle is a transportation vehicle at a target position indicated by a control instruction of another to-be-sorted item. The control unit is further configured to control the target transportation vehicle to move along the direction of the transportation row to the target position indicated by the control instruction.

Figure 6:
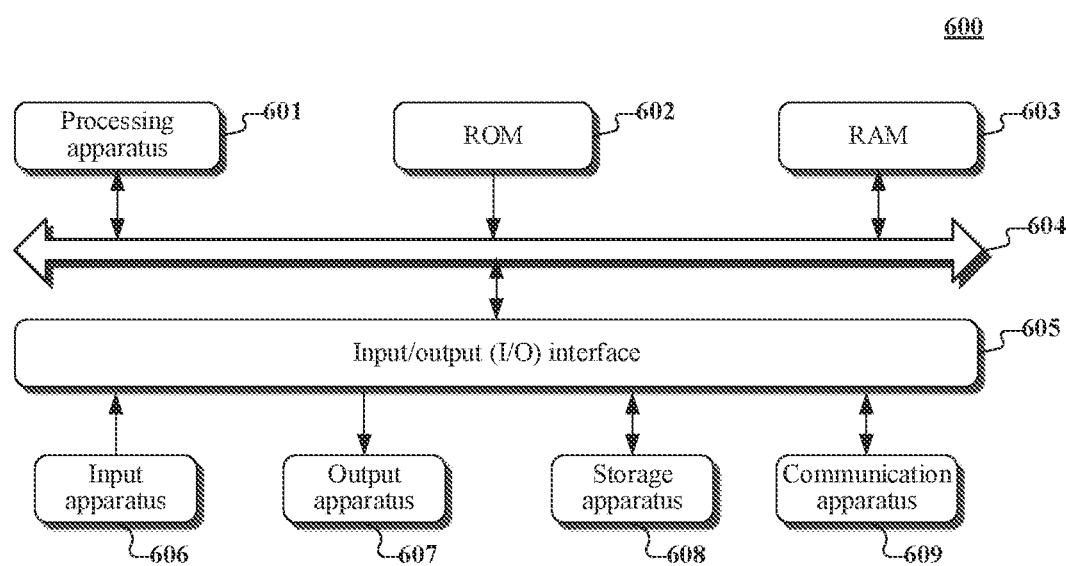
FIG. 6 is a schematic structural diagram of a computer system of an electronic device adapted to implement embodiments of the present disclosure.

As shown in FIG. 6, the electronic device 600 may include a processing apparatus 601 (such as a central processing unit and a graphic processor), which may execute various appropriate actions and processes in accordance with a program stored in a read-only memory (RCM) 602 or a program loaded into a random access memory (RM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses are connected to the I/O interface 605: an input apparatus 606 including a touch screen, a touchpad, a keyboard, a mouse, a camera, a microphone, an accelerometer, a gyroscope and the like; an output apparatus 607 including a liquid crystal display (LCD), a speaker, a vibrator and the like; a storage apparatus 608 including a magnetic tape, a hard disk and the like; and a communication apparatus 609. The communication apparatus 609 may allow the electronic device 600 to perform wireless or wired communication with other devices to exchange data. Although FIG. 6 shows the electronic device 600 having various apparatuses, it should be appreciated that it is not required to implement or provide all the shown apparatuses, and it may alternatively be implemented or provided with more or fewer apparatuses. Each block shown in FIG. 6 may represent one apparatus or multiple apparatuses according to requirements.

In particular, according to some embodiments of the present disclosure, the process described above with reference to the flowchart may be implemented as a computer software program. For example, some embodiments of the present disclosure include a computer program product, which includes a computer program carried on a computer-readable medium. The computer program includes program codes for executing the method shown in the flowchart. In such an embodiment, the computer program may be downloaded and installed from a network via the communication apparatus 609, or may be installed from the storage apparatus 608, or may be installed from the ROM 602. The computer program, when executed by the processing apparatus 601, implements the above functionalities as defined by the method of some embodiments of the present disclosure. It should be noted that the computer-readable medium described by some embodiments of the present disclosure may be computer-readable signal medium or computer-readable storage medium or any combination of the above two. The computer-readable storage medium may be, but is not limited to: an electric, magnetic, optical, electromagnetic, infrared, or semiconductor system, an apparatus, an element, or any combination of the above. A more specific example of the computer-readable storage medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer-readable storage medium may be any physical medium containing or storing programs which can be used by or in combination with an instruction execution system, an apparatus or an element. In some embodiments of the present disclosure, the computer-readable signal medium may include a data signal in the base band or propagating as a part of a carrier, in which computer-readable program codes are carried. The propagating signal may be various forms, including but not limited to: an electromagnetic signal, an optical signal or any suitable combination of the above. The computer-readable signal medium may be any computer-readable medium except for the computer-readable storage medium. The computer-readable signal medium is capable of transmitting, propagating or transferring programs for use by or in combination with an instruction execution system, an apparatus or an element. The program codes contained on the computer-readable medium may be transmitted with any suitable medium including but not limited to: a wire, an optical cable, RF (Radio Frequency), or any suitable combination of the above.

The flowcharts and block diagrams in the accompanying drawings show architectures, functions and operations that may be implemented according to the systems, methods and computer program products of the various embodiments of the present disclosure. In this regard, each of the blocks in the flowcharts or block diagrams may represent a module, a program segment, or a code portion, the module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks n the block diagrams and/or flowcharts may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor, including a control unit, where the name of the unit does not constitute a limitation to such unit itself in some cases. For example, the control unit may alternatively be described as "a unit of controlling, by sending a control instruction, a transportation vehicle to move along a direction of a transportation row to a target position indicated by the control instruction".

In another aspect, the present disclosure further provides a computer-readable medium. The computer-readable medium may be included in the apparatus described in the above-described embodiments; or may alternatively be present alone and not assembled into the apparatus. The computer-readable medium carries one or more programs that, when executed by the apparatus, cause the apparatus to: control, by sending a control instruction, a transportation vehicle to move along a direction of a transportation row to a target position indicated by the control instruction, so that a to-be-sorted item is transferred from the current transportation vehicle on which the to-be-sorted item is currently placed to a next-row transportation vehicle, where a transportation row where the next-row transportation vehicle is located is adjacent to the transportation row where the current transportation vehicle is located in a direction away from the feed inlet.

The above description only provides an explanation of the preferred embodiments of the present disclosure and the technical principles used. It should be appreciated by those skilled in the art that the inventive scope involved in the present disclosure is not limited to the technical solutions formed by the particular combinations of the above technical features. The inventive scope should also cover other technical solutions formed by any combinations of the above technical features or equivalent features thereof without departing from the concept of the present disclosure, such as technical solutions formed through the above features and technical features having similar functions provided (or not provided) in the present disclosure being replaced with each other.

What is claimed is:

1. A sorting apparatus comprising: a plurality of transportation vehicles, wherein
   the plurality of transportation vehicles is distributed on at least two transportation rows, and the at least two transportation rows are arranged along a direction away from a feed inlet;
   wherein the transportation vehicle being configured to move, based on a control instruction comprising a sorting route of a to-be-sorted item, along a direction of the transportation rows sequentially to at least two target positions, each corresponding to a transportation row, indicated by the sorting route, so that the to-be-sorted item is transferred by a current transportation vehicle on which the to-be-sorted item is currently placed to a target position corresponding to a next transportation row where the next-row transportation vehicle is located by a next-row transportation vehicle, wherein the next transportation row is adjacent to the transportation row where the current transportation vehicle is located in a direction away from the feed inlet, and the sorting route indicates the target positions where the to-be-sorted item is located when passing the transportation rows of the sorting apparatus, and indicate a target position on each transportation row.

2. The sorting apparatus according to claim 1, wherein the sorting apparatus further comprises: a plurality of containers, the containers being configured to receive the to-be-sorted item transported by a transportation vehicle on a transportation row farthest from the feed inlet.

3. The sorting apparatus according to claim 1, wherein for adjacent transportation rows, a number of transportation vehicles on a transportation row farther from the feed inlet is greater than or equal to a number of transportation vehicles on a transportation row closer to the feed inlet.

4. The sorting apparatus according to claim 1, wherein the sorting apparatus further comprises a guide rail and a rack, and the transportation vehicle comprises: a conveyor belt, a roller, a driving gear, a servo motor, a linear bearing, a frame and baffles, wherein
the roller is configured to drive the conveyor belt to transport the to-be-sorted item, so that the to-be-sorted item is transferred from the current transportation vehicle to the next-row transportation vehicle;
the servo motor is configured to rotate the driving gear, so that the driving gear drives the rack to perform a transmission, to move the transportation vehicle in the direction of the transportation rows;
the linear bearing is configured to move on the guide rail, wherein the guide rail passes through the linear bearing, and the linear bearing is fixedly connected to the frame; and
the baffles are fixed to the frame and located on both sides of the conveyor belt.

5. The sorting apparatus according to claim 4, wherein a sum of lengths of a plurality of containers along the direction of the transportation row is equal to a length of the guide rail of a transportation row farthest from the feed inlet.

6. The sorting apparatus according to claim 2, wherein the sorting apparatus further comprises grid cell chutes, wherein the grid cell chutes correspond to the plurality of containers, and are configured to allow the to-be-sorted item to slide into the containers corresponding to the grid cell chutes.

7. The sorting apparatus according to claim 6, wherein a number of transportation vehicles on the transportation row farthest from the feed inlet is smaller than or equal to a number of the grid cell chutes.

8. The sorting apparatus according to claim 6, wherein a number of the grid cell chutes is M, and a number of transportation vehicles on the transportation row farthest from the feed inlet is smaller than or equal to a rounded value of M/2.

9. The sorting apparatus according to claim 1, wherein a transportation direction of the transportation vehicle is approximately perpendicular to the direction of the transportation rows.

10. The sorting apparatus according to claim 1, wherein the transportation vehicle is provided with a conveyor belt for transporting the to-be-sorted item, a running direction of the conveyor belt being approximately perpendicular to the direction of the transportation rows.

11. The sorting apparatus according to claim 1, wherein n transportation vehicles are arranged on a nth row of the at least two transportation rows, wherein n is a positive integer.

12. The sorting apparatus according to claim 1, wherein 2n-1 transportation vehicles are arranged on a nth row of the at least two transportation rows, wherein n is a positive integer.

13. A sorting method for a control module of a sorting apparatus, the sorting apparatus comprising: the control module and a plurality of transportation vehicles, the plurality of transportation vehicles being distributed on at least two transportation rows, the at least two transportation rows being arranged along a direction away from a feed inlet; and the method comprising:
controlling, by sending a control instruction comprising a sorting route of a to-be-sorted item, a transportation vehicle to move along a direction of the transportation rows to at least two target positions, each corresponding to a transportation row, indicated by the sorting route, so that the to-be-sorted item is transferred by a current transportation vehicle on which the to-be-sorted item is currently placed to a target position corresponding to a next transportation row where the next-row transportation vehicle is located by a next-row transportation vehicle, wherein the next transportation row is located is adjacent to the transportation row where the current transportation vehicle is located in a direction away from the feed inlet, and the sorting route indicates the target positions where the to-be-sorted item is located when passing the transportation rows of the sorting apparatus, and indicate a target position on each transportation row.

14. The sorting method according to claim 13, wherein the method further comprises:
acquiring a processing result by preprocessing the to-be-sorted item, wherein the preprocessing comprises any one of two following operations: scanning, or image acquisition and recognition;
determining, based on the processing result, a sorting route of the to-be-sorted item; and
generating, based on the sorting route, the control instruction.

15. The sorting method according to claim 14, wherein the sorting apparatus further comprises: a plurality of containers, the containers being configured to receive the to-be-sorted item transported by a transportation vehicle on a transportation row farthest from the feed inlet;
determining, based on the processing result, the sorting route of the to-be-sorted item comprises:
selecting, based on the processing result and a preset corresponding relationship between the processing result and the container, a container from the plurality of containers as a target container; and generating, based on a position of the target container, the sorting route from the feed inlet to the target container; or
selecting, based on the processing result and a corresponding relationship between the processing result and the sorting route, the sorting route from preset candidate sorting routes, wherein the sorting route comprises one of the plurality of containers or a target position of the transportation vehicle on the transportation row farthest from the feed inlet.

16. The sorting method according to claim 13, wherein the method further comprises:
selecting a transportation vehicle closest to the target position from transportation vehicles on a transportation row as a target transportation vehicle; or selecting, based on distances between the transportation vehicles and the target position, a transportation vehicle other than a selected transportation vehicle as the target transportation vehicle, wherein the selected transportation vehicle is a transportation vehicle at a target position indicated by a control instruction of another to-be-sorted item; and controlling the transportation vehicle to move along the direction of the transportation rows to the target position indicated by the control instruction comprises:

controlling the target transportation vehicle to move along the direction of the transportation row to the target position indicated by the control instruction.

17. An electronic device, comprising:

one or more processors;

a storage apparatus configured to store one or more programs, wherein the one or more programs, when executed by the one or more processors, cause the one or more processor to perform operations comprising:

controlling, by sending a control instruction comprising a sorting route of a to-be-sorted item, a transportation vehicle to move along a direction of the transportation rows sequentially to at least two target positions, each corresponding to a transportation row, indicated by the sorting route, so that the to-be-sorted item is transferred by a current transportation vehicle on which the to-be-sorted item is currently placed to a target position corresponding to a next transportation row where the next-row transportation vehicle is located by a next-row transportation vehicle, wherein the next transportation row is located is adjacent to the transportation row where the current transportation vehicle is located in a direction away from the feed inlet, and the sorting route indicates the target positions where the to-be-sorted item is located when passing the transportation rows of the sorting apparatus, and indicate a target position on each transportation row.

18. A computer-readable storage medium storing a computer program, wherein the program, when executed by a processor, implements the method according claim 13.

* * * * *